United States Patent [19]

Dubberly et al.

[11] 4,276,467
[45] Jun. 30, 1981

[54] APPARATUS FOR RECEIVING EMPTY BEVERAGE CONTAINERS

[75] Inventors: Gregory T. Dubberly, Atlanta, Ga.; Robert J. McGowan, Xenia, Ohio

[73] Assignee: The Mead Corporation, Dayton, Ohio

[21] Appl. No.: 924,855

[22] Filed: Jul. 17, 1978

[51] Int. Cl.³ .......................................... G06M 7/00
[52] U.S. Cl. .......................... 235/92 PK; 235/92 V; 235/92 DN; 250/223 B
[58] Field of Search .......... 235/92 PK, 92 V, 92 PE, 235/92 CP, 92 DN; 209/111.7 T; 250/223 B

[56] References Cited

U.S. PATENT DOCUMENTS

| | | | |
|---|---|---|---|
| 3,257,897 | 6/1966 | Schneider | 250/223 B |
| 3,265,901 | 8/1966 | Schneider | 250/223 B |
| 3,365,699 | 1/1968 | Foster | 340/146.3 F |
| 3,455,444 | 7/1969 | Simmons | 209/82 |
| 3,513,444 | 5/1970 | Henderson et al. | 364/900 |
| 3,529,169 | 9/1970 | Heaney et al. | 250/223 |
| 3,549,890 | 12/1970 | Keller | 250/209 |
| 3,669,263 | 6/1972 | Babb | 209/82 |
| 3,837,486 | 9/1974 | Gardner | 209/111.7 |
| 3,840,857 | 10/1974 | Knight et al. | 340/146.3 F |
| 3,955,179 | 5/1976 | Planke | 235/92PK |
| 4,055,834 | 10/1977 | Planke | 340/146.3 F |
| 4,079,416 | 3/1978 | Faani et al. | 235/92 V |
| 4,120,403 | 10/1978 | Stephanos | 209/564 |

Primary Examiner—Joseph M. Thesz
Attorney, Agent, or Firm—Biebel, French & Nauman

[57] ABSTRACT

An apparatus for receiving and handling empty beverage containers. The empty containers may be received either individually or in cartons upon a moving conveyor. An alignment mechanism separates the containers and moves them to one side of the conveyor. A switch arrangement senses cartons, so that the system can process cartons of empty containers in a different manner than individual empty containers. The containers, whether individually or in cartons, pass through an illumination station wherein they interrupt illumination falling upon a row of photocells. Output signals from the photocells are transmitted to identification circuitry together with clock signals generated in synchronism with the movement of the conveyor. The identification circuitry generates registration signals, which are used to compute value of the containers being received. A paddle mechanism shifts the cartons to a separating station, which forwards properly filled cartons to a storage area. Improperly filled cartons are returned to a point near the receiving area.

19 Claims, 11 Drawing Figures

REGISTRATION

FIG-4B

REGISTRATION

MONEY SELECT

APPARATUS FOR RECEIVING EMPTY BEVERAGE CONTAINERS

BACKGROUND OF THE INVENTION

This invention relates to systems for receiving and evaluating empty beverage containers of a type known in the trade as returnable. These are containers, usually glass bottles, for which the beverage purchaser is charged a deposit fee at the time of purchase. When the purchaser returns the empty container to a designated redemption center, the deposit fee is refunded. Most beverage sales outlets also operate redemption centers, and the operation of these centers is usually a troublesome matter which takes clerks away from other more profitable tasks.

Beverages are commonly sold in containers of many different sizes, and in cartons containing groups of six or eight such containers. The customer may return the containers either individually or in cartons and may mix different types of containers in a single carton. It is the task of the redemption center clerk to sort or classify the containers in accordance with their deposit values and to calculate the refund which is due. The clerk may make an actual refund or may give the customer a refund slip which can be redeemed at another location. This operation is so unprofitable that many supermarkets simply operate on an honor system, whereby customers stack their empties at a receiving location and report the return to a checkout clerk, who makes the appropriate refund.

An alternative to the above described redemption techniques is an automatic system such as a system of the type described in Planke U.S. Pat. No. 3,955,179. This system has a pair of conveyors, one for individual empty bottles and one for cartons. In operation the customer places the returned bottles and cartons on the appropriate conveyor for transportation through an illumination station. At the illumination station the containers are illuminated by a beam of collimated light, and a shadow of the containers is projected against an array of photodetectors. The containers are identified by their shadows. This identification results in control signals for a logic network which computes the amount of the refund and controls the printing of a refund slip by an associated printer.

SUMMARY OF THE INVENTION

The present invention relates to apparatus for receiving empty beverage containers and classifying them into value groups based upon observations made by a group of photocells arranged in a single vertically extending line. The empty containers are placed upon a conveyor, which has an attachment for generating clock signals based upon conveyor movement. Identification of the empty containers is made by identification means, which receive output signals from the photocells and evaluates those signals under gating control of the clock signals from the conveyor. A series of registration circuits within the identification means are enabled when an empty container first crosses the line of photocells, and all of the circuits begin counting conveyor clock pulses at that time. Each registration circuit has a gating arrangement which is enabled during a predetermined count range. If the container clears the line of photocells during that count period, then the registration circuit transmits a registration signal to a money select circuit. The system provides a value count corresponding to the total value of the containers which are "registered" by the registration circuits. Registration circuits are provided for registering pairs of empty containers contained within cartons, so that both individual containers and cartons of containers may be received upon a common conveyor. Means are provided for separating cartons from individual bottles. Other means separate properly filled cartons from improperly filled cartons. Improperly filled cartons are returned to a point near the receiving end of the conveyor.

DESCRIPTION OF THE PREFERRED EMBODIMENT

Figure 1:
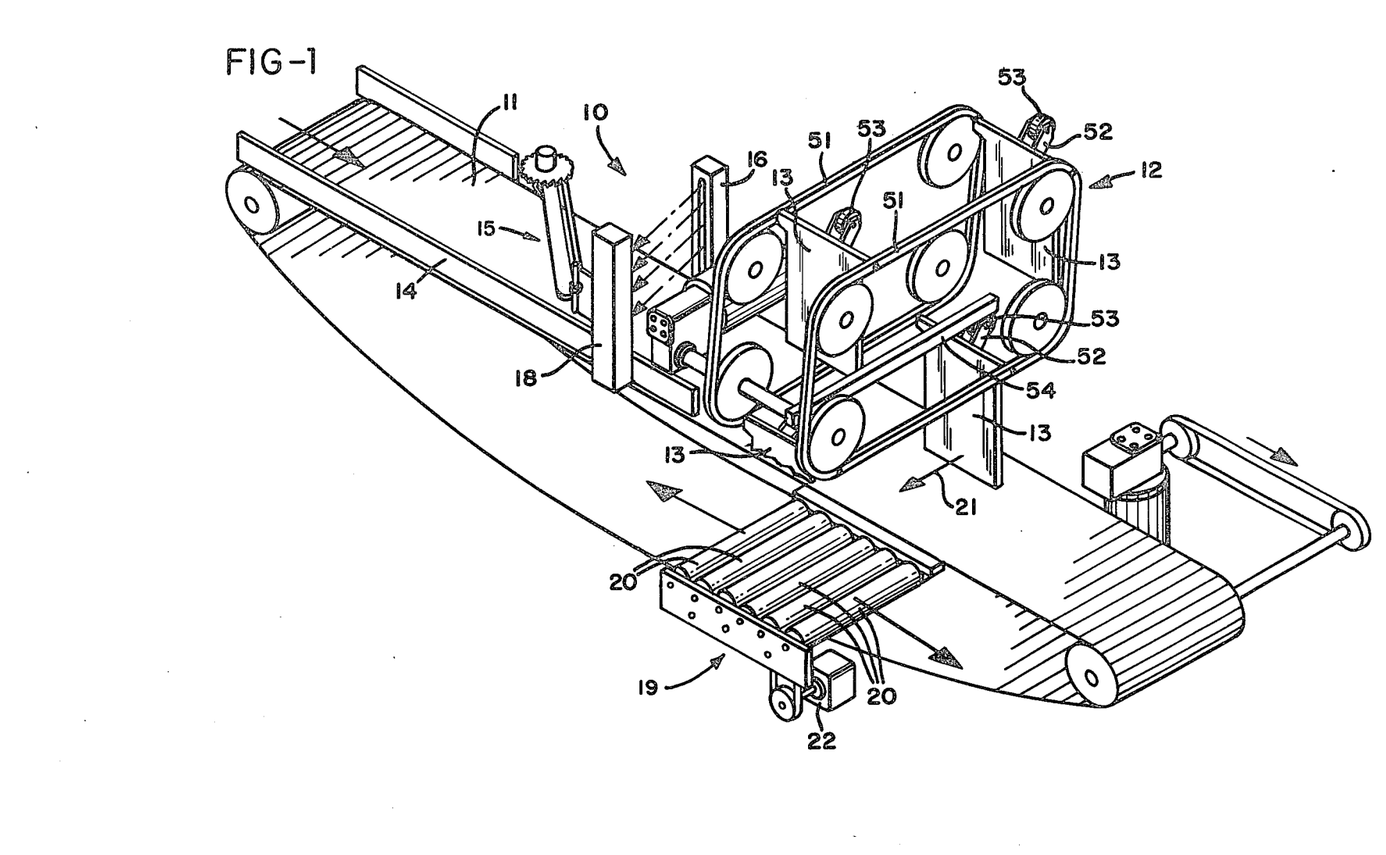
FIG. 1 is a schematic drawing of the mechanism of this invention.

A conveyor arrangement 10 in accordance with this invention may be constructed as schematically illustrated in FIG. 1. The arrangement includes a conveyor belt 11, with associated driving elements, aligning mechanism as indicated generally at 15 and a paddle arrangement as indicated generally at 12. The cooperating operation of conveyor belt 11, paddle arrangement 12, and aligning mechanism 15 can best be understood by reference to FIG. 2.

Figure 2:
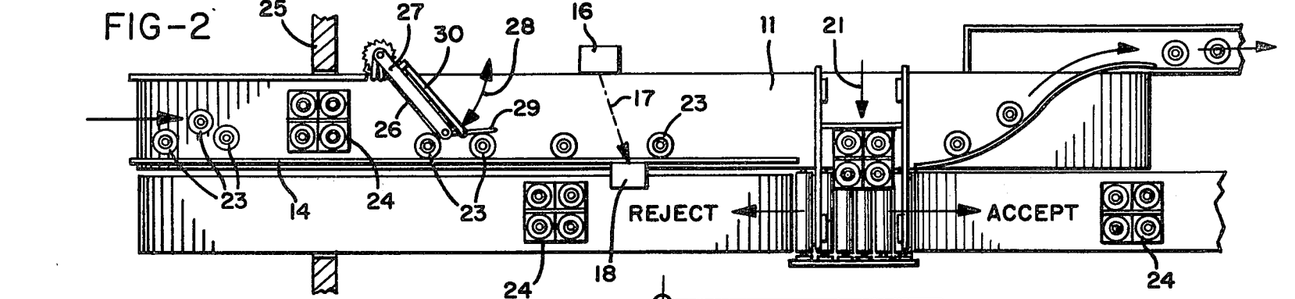
FIG. 2 is a plan view of container handling mechanism in accordance with this invention.

Movement of belt 11 is initiated by pushing a start button on a control panel (not illustrated). A customer who wishes to obtain a refund for empty beverage containers pushes the start button and thereafter loads individual empty containers 23 and cartons of empty containers 24 upon belt 11. Loading is performed at a receiving station, which is separated from the major portions of conveyor 10 by a wall 25.

After being loaded upon belt 11, individual containers 23 and cartons 24 are met by a friction surface 26 on arm 27 of aligning mechanism 15. A ratchet arrangement causes arm 27 to oscillate back and forth as illustrated generally by the arrow 28, and this urges the containers and cartons sidewardly against sideboard 14. Sideboard 14 has a friction surface, which retards forward movement of the containers and cartons. The containers and cartons are trapped against sideboard 14 and behind arm 27 until released by outward movement of the arm. A blade 29 is pivotally attached to arm 27 and is urged against the cartons and containers by a spring mechanism 30. This produces separation between the cartons and containers in the direction of belt movement.

After movement past aligning mechanism 15, the containers and cartons pass a series of microswitches (not illustrated), which are positioned so as to be actuated only by cartons. Thereafter the containers and cartons pass into an illumination region between an illuminating apparatus 16 and a series of photosensors 18. Illuminating apparatus 16 generates a series of illuminating beams 17, which are directed angularly with respect to the direction transverse to the direction of conveyor movement. The angle between the beam direction and the transverse direction is preferably in the order of about 18 degrees, so that the identification circuits can recognize pairs of containers within a carton. Each beam 17 is directed toward an individual photocell 31 (FIG. 3), and the beams are preferably beams of collimated infrared light produced by TIL 31 infrared light sources and collimating lenses. Preferably each beam 17 has a diameter in the order of about one-quarter inch.

After passage through the illuminating station the containers and cartons pass under paddle arrangement 12. Paddle arrangement 12 includes a series of paddles 13, which may be actuated to move in the direction indicated by the arrow 21. Paddle arrangement 12 is actuated whenever a carton 24 is positioned thereunder. As mentioned previously, the system is conditioned by a series of switches to discriminate between cartons and individual containers. Thus paddle arrangement 12 is never actuated during passage of an individual container thereunder, so that individual containers are carried along to a bottle storage area.

When paddle arrangement 12 is actuated, a paddle 13 is brought into contact with the side of a carton, and the carton is pushed transversely onto a separating station 19. Paddles 13 swing freely in ferris wheel fashion on chains 51, but during the lower quadrant of their movement, they are held rigidly downward by arms 52 which include a roller 53 for bearing against a track 54. This enables the paddles to push sidewardly against cartons.

Separating station 19 comprises a series of rollers 20, which are driven either forwardly or reversely by a drive motor 22. If the system recognizes the carton as being properly loaded, then drive motor 22 drives rollers forwardly, and the carton is accepted. If the carton is improperly loaded with bottles of different size or has empty cells, then motor 22 drives rollers 22 reversely, and the carton is rejected.

Figure 3:
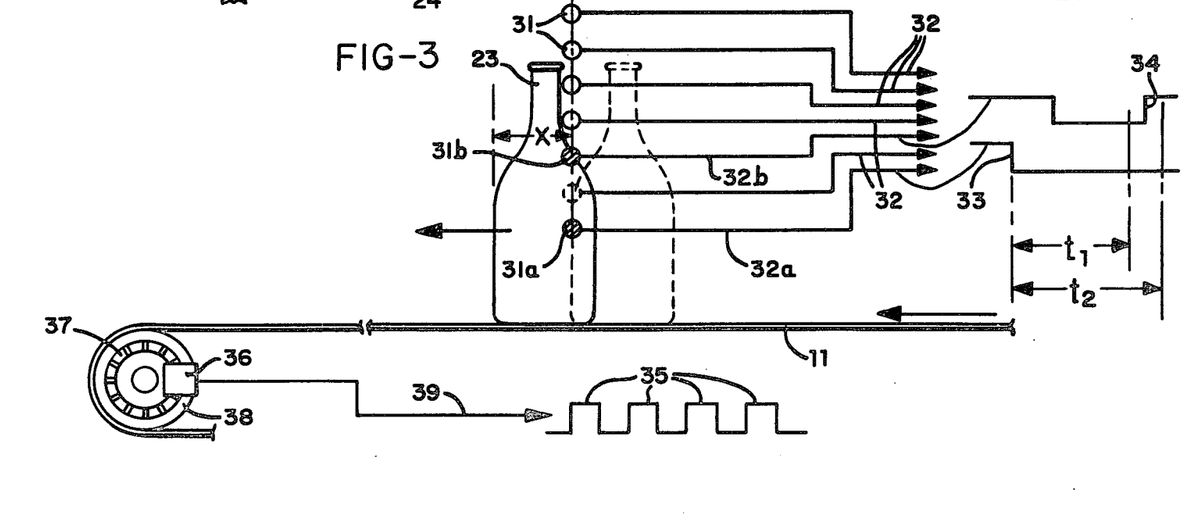
FIG. 3 is a schematic illustration of container movement during recognition by a row of photocells and associated circuitry.

The technique for identifying a container for refund purposes can be understood by reference to FIG. 3. As the belt 33 carries a container 23 in front of photosensor array 18, the light falling upon the vertically arranged row of photocells 31 is periodically blocked. Each photocell 31 has an output line 32, which transmits an electrical signal corresponding to light and dark conditions at the photocell. By way of example, the illustrated photocell 31a may be the first photocell to sense the presence of the container 23. This causes a transition in the output signal from line 32a as indicated at 33. A second photocell 31b has a light to dark transition somewhat later in time, followed at a still later time by a dark to light transition, both transitions being indicated by the output signal on line 32b. The latter transition on the output signal from line 32b is indicated by the reference numeral 34. Lines 32 are connected through a series of gates to different ones of a plurality of registration circuits. For processing the container illustrated in FIG. 3, one such registration circuit is connected to lines 32a and 32b and is configured in such a manner as to generate a registration pulse if the transition 34 occurs after time $t_1$ and before time $t_2$. The time period between time $t_1$ and $t_2$ is established by counting a series of clock pulses 35 generated by an encoder 36 arranged for viewing an optical disc 37 mounted on the drive motor 38. Output pulses from encoder 36 are carried by line 39.

It will be seen that clock pulses 35 occur in synchronism with the actual physical movement of container 23. In a typical case such an encoding arrangement may generate a new clock pulse 35 each time container 23 moves a distance of 0.01 inches. Thus by counting the clock pulses 35 the registration circuitry responds to beverage containers having a particular horizontal dimension within some predetermined dimensional range. For instance, a particular registration circuit may be configured for recognizing bottles having an illustrated dimension X equal to 2.5 inches. A bottle meeting this criterion would cause the transition 34 to occur on line 32b at a point in time determined by counting 250 of the clock pulses 35. In order to allow for some error a registration "window" of perhaps 20 clock pulses might be employed. This would cause generation of a registration signal for bottles having a dimension X ranging between 2.4 inches and 2.6 inches. It is apparent that a system constructed in accordance with this invention could be made to recognize a great many different registration conditions.

Electrical circuitry for controlling the apparatus of FIGS. 1 and 2 and generating container value signals is illustrated in FIGS. 4A, 4B, 5A, 5B, 6A, 6B, 7A, and 7B. In addition to the illustrated circuitry the apparatus utilizes fairly conventional power supplies, display controls, transmission lines, clock signal generators, photosensor drivers, and amplifiers. Table I lists circuit types for integrated circuits illustrated in the detailed electrical schematics presented herein. The circuit types listed in Table I are readily available in the trade under designations including the listed number, together with letters identifying any one of a number of different manufacturers.

TABLE I

| Reference Numeral | Circuit Type |
|---|---|
| 401 | 4013 |
| 402 | 14557 |
| 403 | 14557 |
| 404 | 4013 |
| 405 | 14557 |
| 406 | 14557 |
| 407 | 14557 |
| 408 | 14557 |
| 409 | 4013 |
| 410 | 4013 |
| 411 | 4013 |
| 412 | 4013 |
| 413 | 14528 |
| 415 | 14528 |
| 501 | 4076 |
| 502 | 4076 |
| 503 | 4013 |
| 504 | 4013 |
| 505 | 14040 |
| 506 | 4013 |
| 507 | 4013 |
| 601 | 4008 |
| 602 | 4008 |
| 603 | 4008 |
| 604 | 4076 |
| 605 | 4076 |
| 606 | 4076 |
| 607 | 4029 |
| 608 | 4029 |
| 609 | 4029 |
| 701 | 4013 |
| 702 | 4013 |
| 703 | 4013 |
| 704 | 4013 |
| 705 | 4013 |
| 706 | 4013 |

TABLE I-continued

| Reference Numeral | Circuit Type |
|---|---|
| 707 | 4013 |
| 708 | 4013 |
| 709 | 4013 |
| 710 | 4013 |
| 711 | 4013 |
| 712 | 4013 |
| 713 | 4029 |
| 714 | 4013 |

Figure 4A:
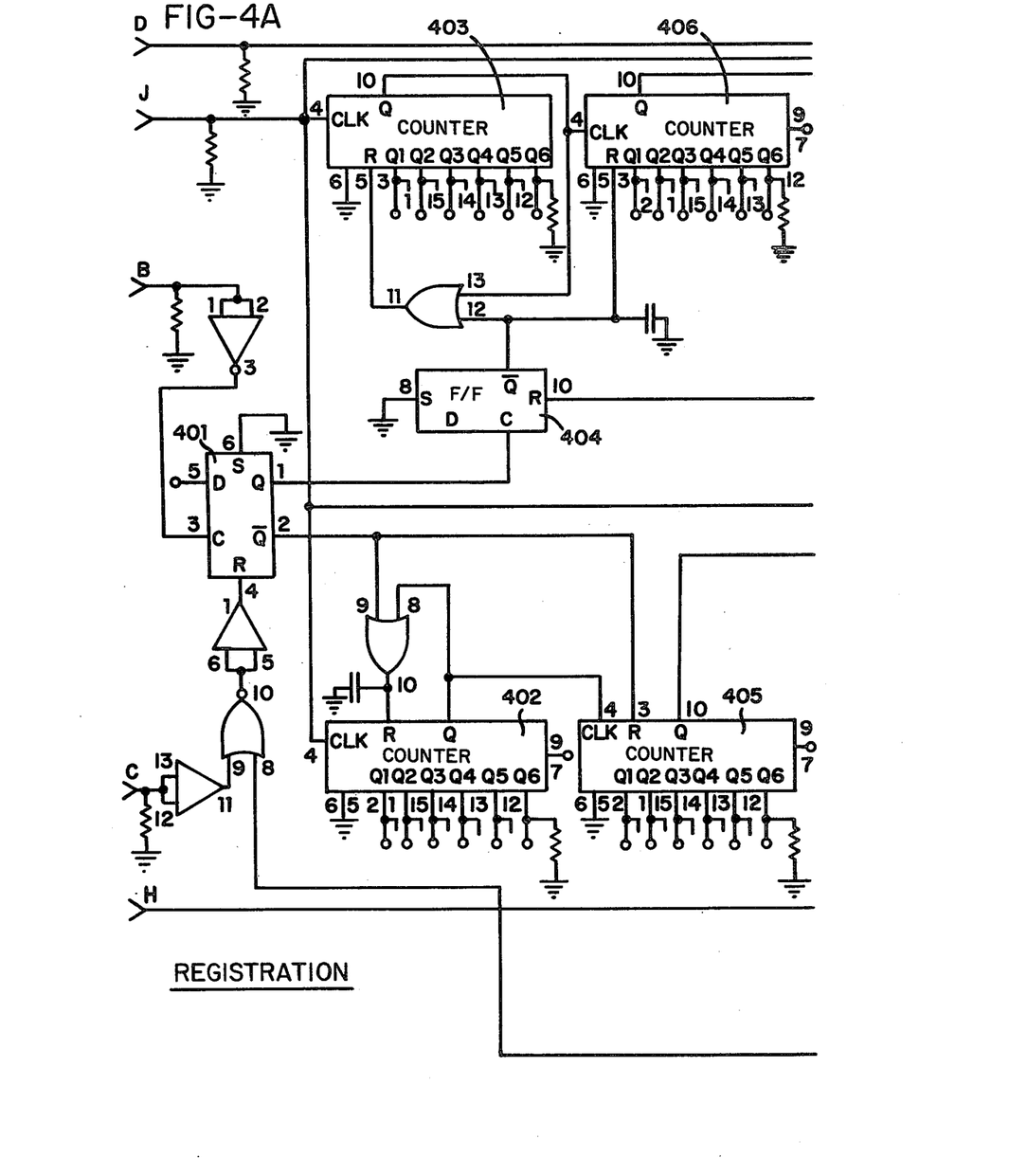
FIGS. 4A and 4B is a schematic drawing of registration circuitry.
Figure 4B:
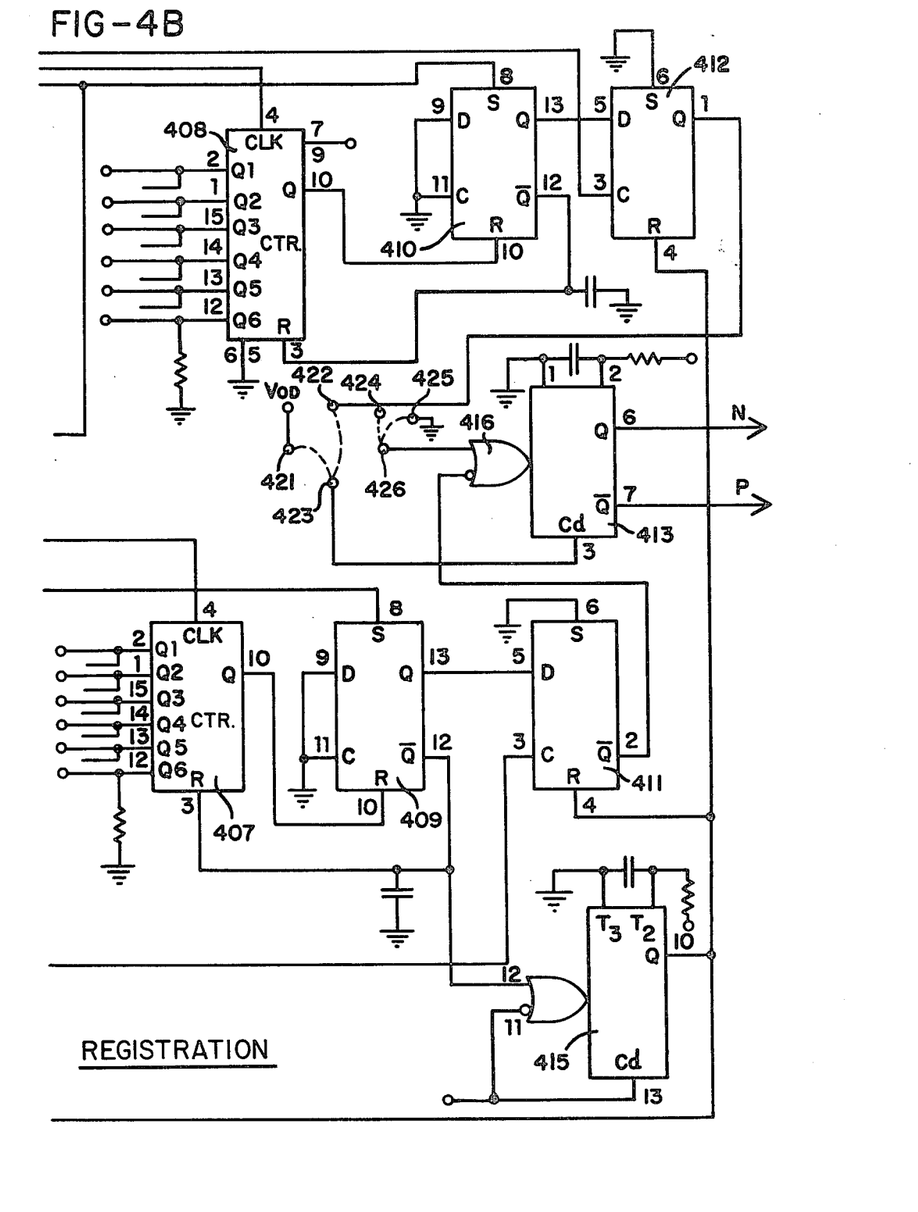

FIGS. 4A and 4B illustrate the registration circuitry, which generates the above mentioned registration pulses. The circuitry of FIGS. 4A and 4B generates a registration signal for a container having a particular dimension within some predetermined range or for different containers having the specified dimension within that range. Typically empty containers can be grouped in groups having some common dimensional characteristic within a relatively small dimensional range and a common refund value. The circuitry of FIGS. 4A and 4B would generate a registration signal for all such containers, and this registration signal would appear at output terminals 6 and 7 of integrated circuit 413. Containers having a different common dimensional characteristic are identified by registration circuitry similar to the circuitry of FIGS. 4A and 4B but programmed in a different manner as hereinafter described. Additional registration circuits are provided for recognizing pairs of containers positioned within cartons. For such pairs of containers the recognition count begins at the leading edge of one container and terminates at the trailing edge of the other container. This type of recognition or registration is performed by observing those portions of the container pairs which extend upwardly above the sides of the carton.

Conveyor clock pulses 35 are received at terminal J of the registration circuitry and are applied to the clock terminals of counters 402 and 403. Counting of such clock pulses is enabled by a signal at terminal B, and this signal may be the transition 33 appearing on line 32a as described above with reference to FIG. 3. The signal level at terminal C also controls conveyor clock counting. Terminal C is connected to that one of photocells 31 which is located at a height immediately over the top of the container. The photocell which is connected to terminal C must be illuminated to order for counting to be enabled.

It will be seen that counter 402 is connected to a counter 405 in serial fashion, so that an output appears at terminal 10 of counter 405 after a predetermined number of conveyor clock pulses have been counted. This count, which takes place during a time period $t_1$ as illustrated in FIG. 3, is controlled by presetting the counting control terminals of counters 402 and 405.

When the preset count is reached, flip-flop 409 is set, and counter 407 is enabled to begin counting conveyor clock pulses. Counter 407 is set to count a predetermined number of conveyor clock pulses corresponding to the desired registration window. Flip-flop 409 is reset when this predetermined count has been reached.

While clock 407 is counting, input terminal 5 of flip-flop 411 is HI, so that the flip-flop is conditioned to respond to a signal transition, such as the transition 34, appearing on input terminal H. If the signal transition occurs at terminal H during the registration window, then flip-flop 411 is triggered to produce an output for application to gate portion 416 of integrated circuit 413.

Integrated circuit 413 produces registration output signals on its N and P terminals.

Six terminals 421 through 426 are provided for added counting flexibility. For a simple registration, as above described, a jumper is attached between terminals 421 and 423, and another jumper is attached between terminals 425 and 426. Different jumper connections may be made in order to enable registration on the basis of photocell transitions appearing at both of terminals D and H. In the case where photocell transitions appearing at terminal D are to be recognized, counters 403, 406 and 408 are utilized. These counters work in a manner similar to counters 402, 405, and 407 for controlling flip-flops 410 and 412. If it is desired to condition the registration signal output upon occurrence of appropriately timed signal transitions at both of terminals D and H., then a jumper is placed between terminals 422 and 423 and another jumper is placed between terminals 425 and 426. A sequential count registration condition can be made by placing a jumper between terminals 421 and 423 and another jumper between terminals 424 and 426.

Figure 6A:
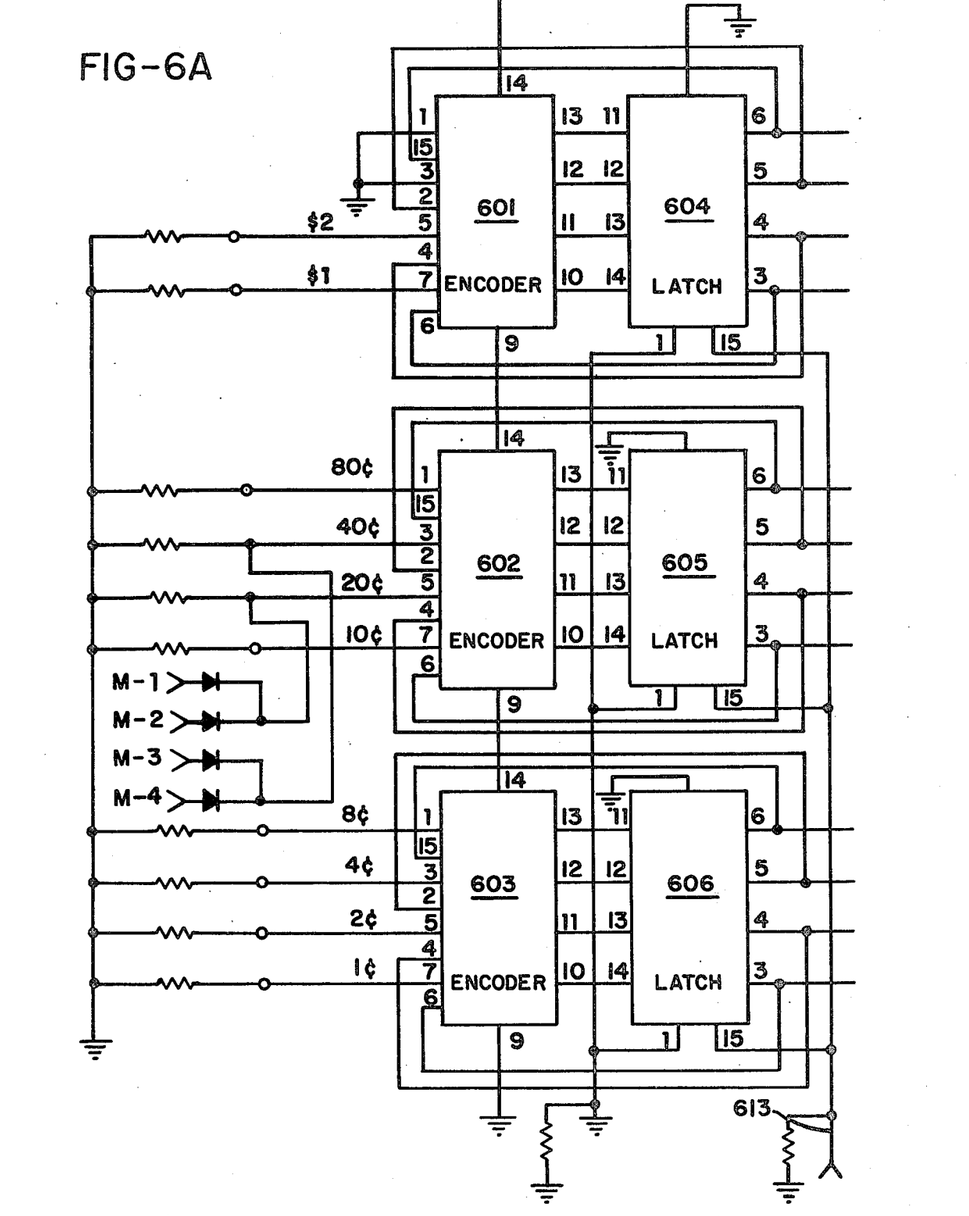
FIGS. 6A and 6B are a schematic drawing of money select circuitry.
Figure 6B:
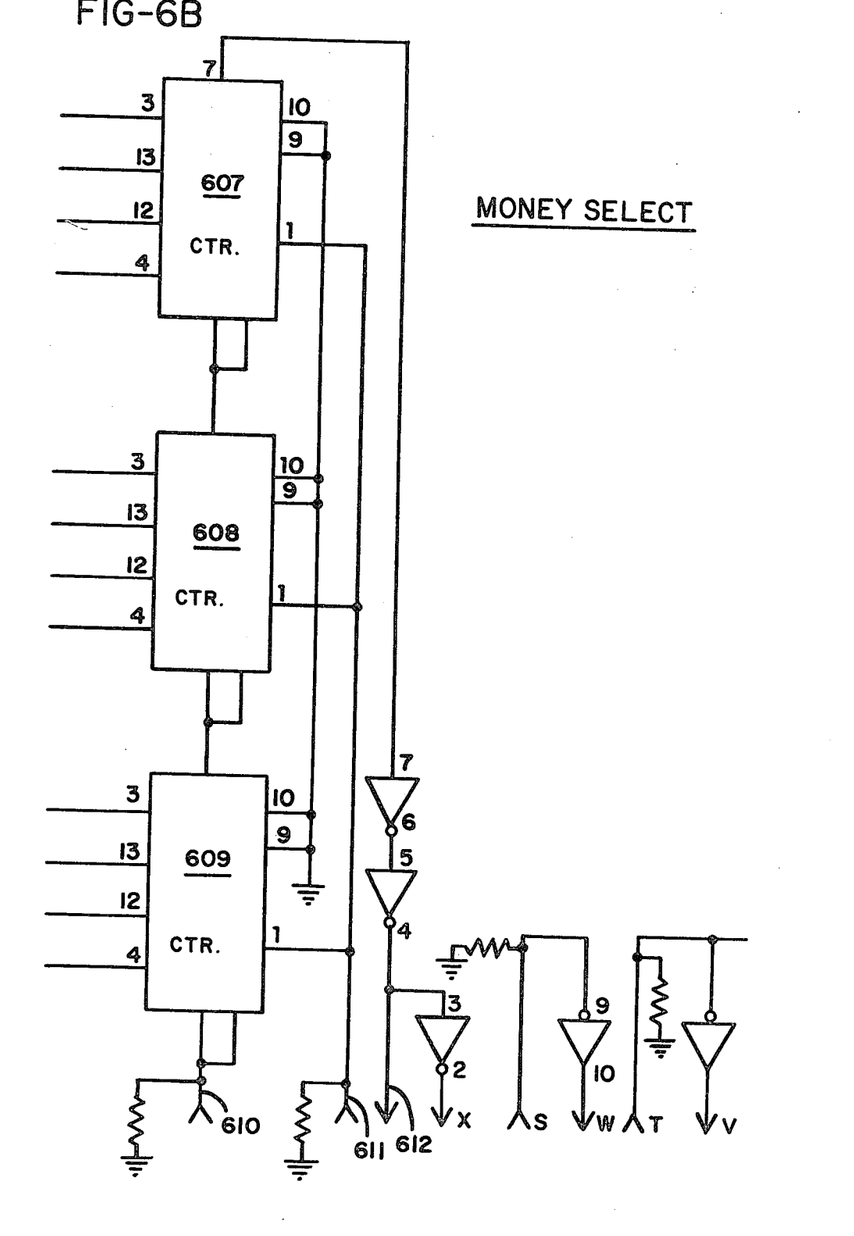

When registration signals are generated by the registration circuitry, they are applied to input terminals for money select circuitry as illustrated in FIGS. 6A and 6B. Connections to this circuitry in general depend upon the types of containers expected. For instance, in a market area wherein there are only 10 cent bottles and 20 cent bottles to be received, the money select circuitry may be connected to receive registration inputs only from terminals M-1 through M-4 as illustrated. Terminal M-1 might be connected to receive registration signals from registration circuitry which recognizes individual 10 cent bottles, while terminal M-2 might be connected to receive registration signals only from circuitry which recognizes pairs of 10 cent bottles arranged side by side in cartons. Similarly, input terminals M-3 and M-4 may receive registration signals for individual 20 cent bottles and 20 cent bottle pairs respectively.

If 10 cent bottles are returned in a six bottle carton, three registration signals will appear at terminal M-2, and three 20 cent counts will be made by the system. If a single 10 cent bottle is registered, then a single 20 cent count is made. The calculation circuitry of FIGS. 7A and 7B perform a division by 2 in order to reduce such a single 20 cent count to a 10 cent output. 20 cent bottles are handled in a similar manner.

For the above example money counts are added by integrated circuits 602 and 605 and later counted down serially through a counting chain comprising counters 607, 608 and 609. For the described arrangement integrated circuits 601, 603, 604 and 606 are not utilized. Counting of the stored money value is initiated by a signal at line 611, which is generated by the calculation circuitry of FIGS. 7A and 7B and appears as an output at line 715 thereof. The money select circuitry counts 100 KHz clock pulses appearing at line 610, and when the countdown is completed a DONE signal appears at line 612.

Figure 5A:
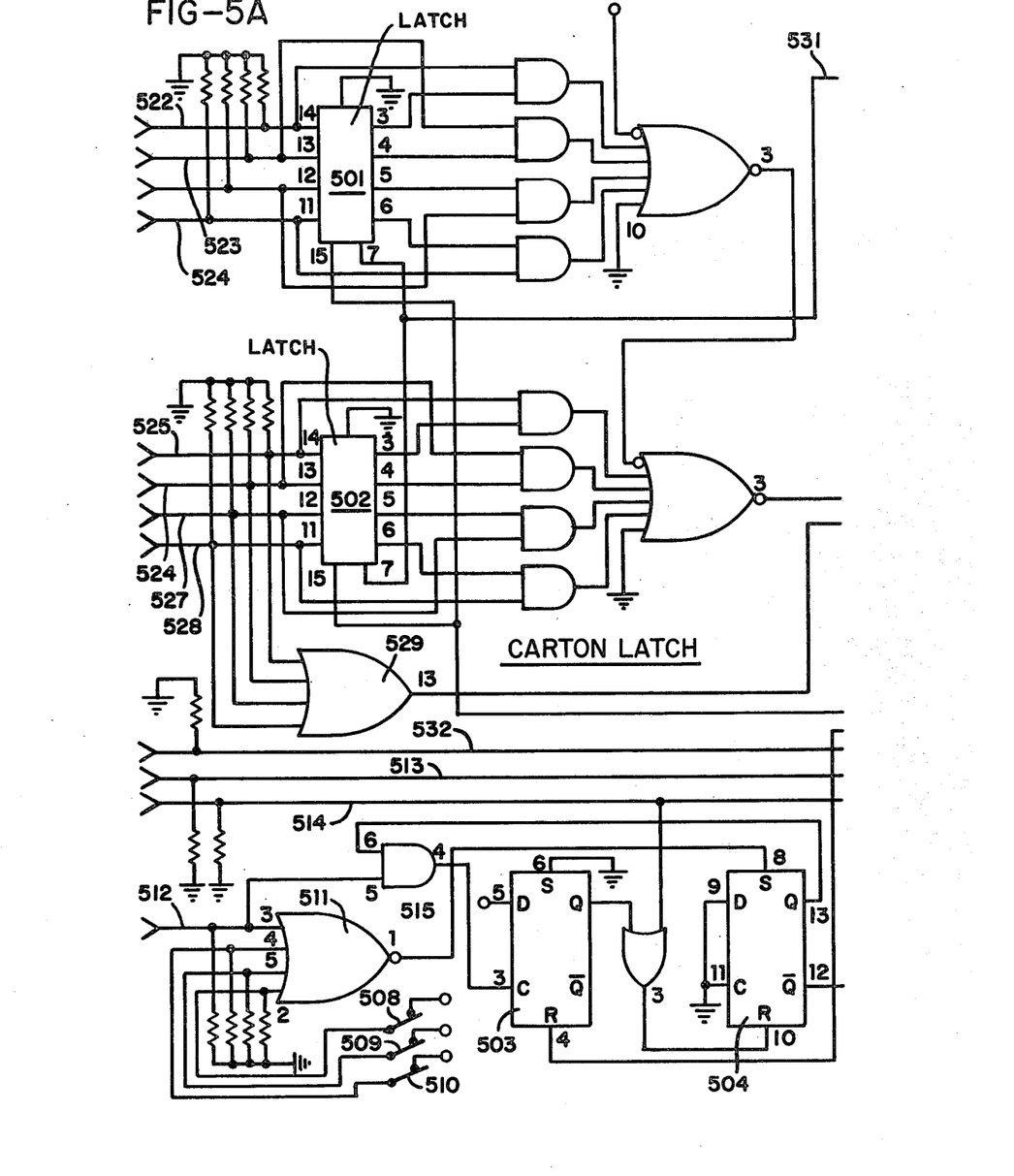
FIGS. 5A and 5B is a schematic drawing of carton latch circuitry.
Figure 5B:
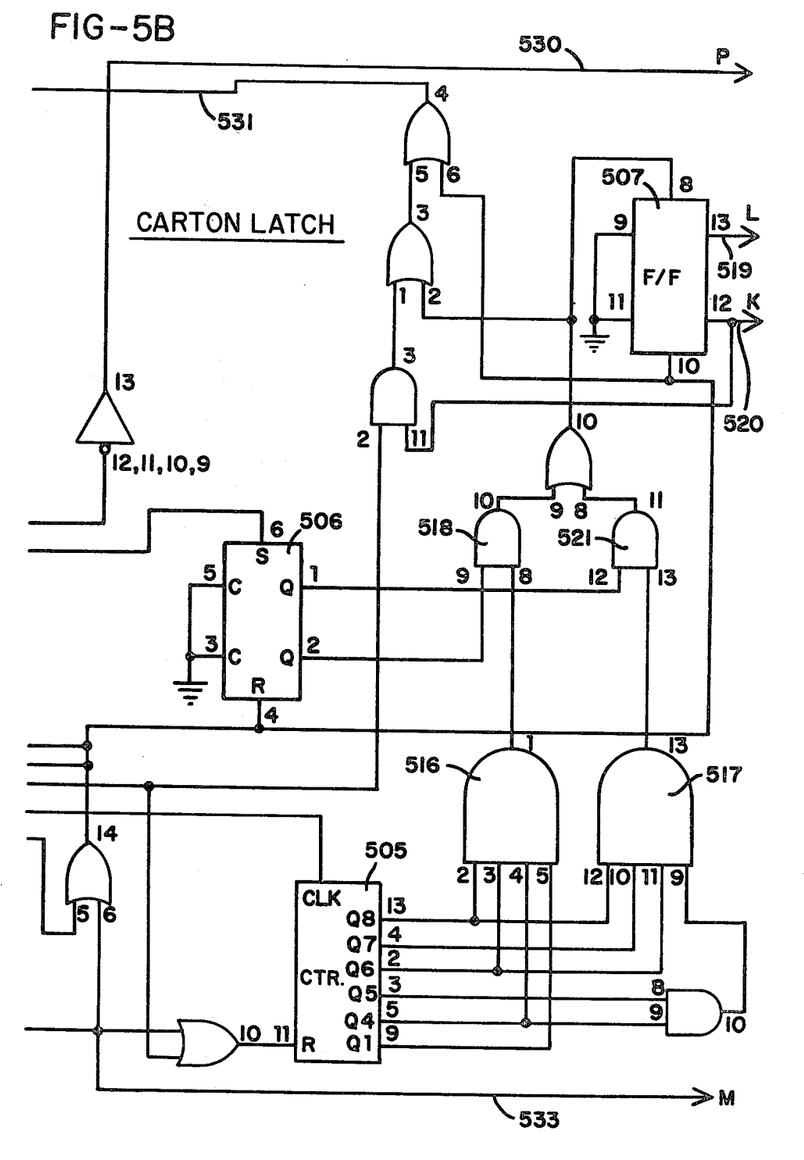

FIGS. 5A and 5B illustrate the carton latch circuitry, which conditions other circuitry for recognizing and handling carton registration information. Carton recognition information is provided by three microswitches located on the conveyor and by the lower most of photocells 31. The three microswitches are illustrated schematically on FIG. 5A as switches 508, 509 and 510. The input signal from the lowermost photocell is received by the carton latch circuitry on line 512. During a condition when the lower most photocell is darkened and switches 508 through 510 are closed, an output from gate 511 sets flip-flop 504. At the same time gate 515 is activated to permit later shutdown of the system.

When flip-flop 504 is set, the reset output at pin 12 enables counter 505 to begin counting conveyor clock pulses 35 received on line 513. The output count from counter 505 is applied to a small bottle gate 516 and a large bottle gate 517. When the output count from counter 505 indicates a distance equal to the maximum dimension of a pair of small bottles, then gate 516 enables another gate 518. If at that time gate 518 is also sensing a small bottle output signal from pin 2 of flip-flop 506, then flip-flop 507 is set to provide failure signals on lines 519 and 520. Similarly gate 517 creates large bottle failure signals through gate 521 and flip-flop 507. This enables the circuitry of FIGS. 5A and 5B to provide a failure signal on lines 519 and 520 if a carton is detected and one of the carton cells is empty.

Registration signals for bottle pairs are transmitted from the registration circuits to the carton latch circuitry on lines 522 through 528. Registration circuits for large bottle pairs are connected to lines 522 through 524, while registration circuits for small bottle pairs are connected to lines 525 through 528. Signals on lines 522 through 528 control the setting of flip-flop 506 through gate 529. Each time the carton latch circuitry receives a registration signal for a bottle pair (or a single bottle in special type cartons) an output pulse is provided on line 530, provided, however, that no failure signal has previously been generated. Whenever conditions are met for generating a carton failure signal, a signal is also generated on line 531 for inhibiting latches 501 and 502 and preventing transmission of registration signals by line 530.

The carton latch circuitry also utilizes a carton registration delay signal, which it receives on line 532 and a master clear signal, which it receives on line 514.

Figure 7A:
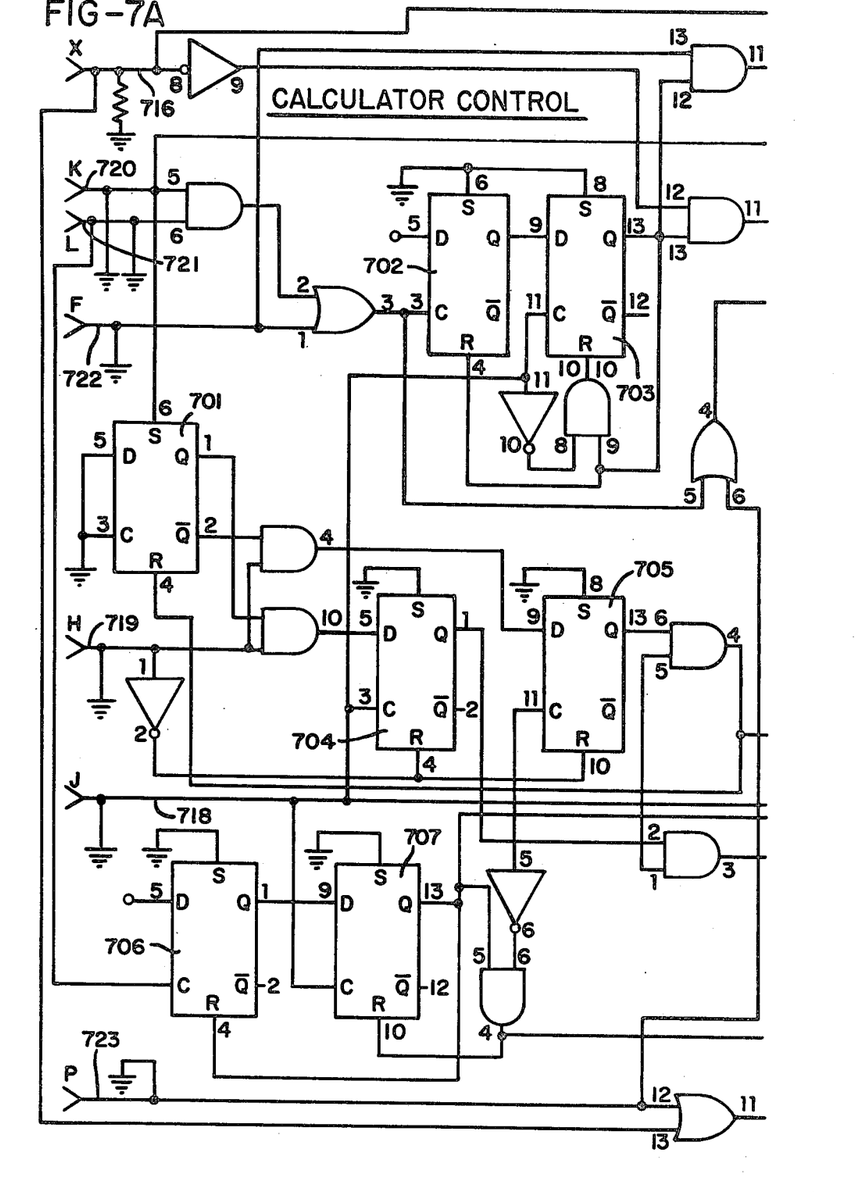
FIGS. 7A and 7B are a schematic drawing of calculation circuitry.
Figure 7B:
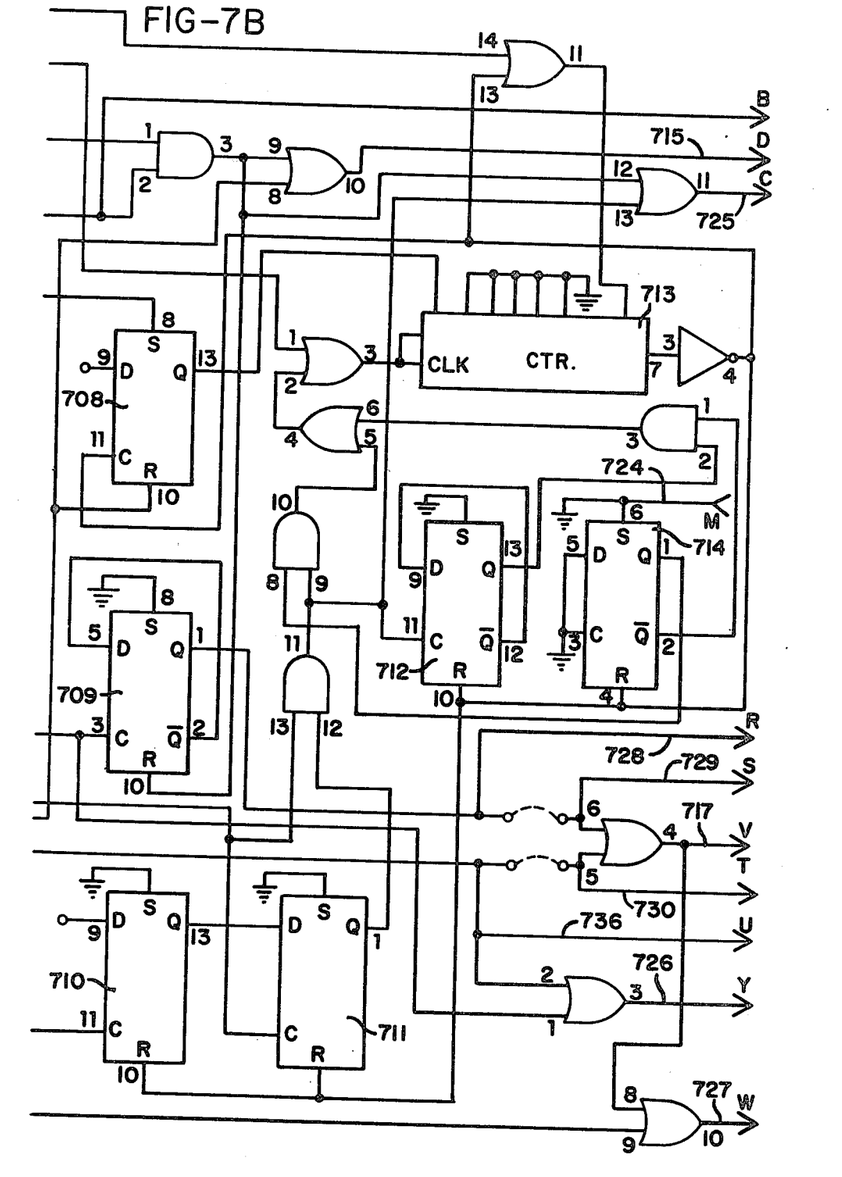

When a carton failure signal appears on line 519, it is transmitted to the calculation circuitry of FIGS. 7A and 7B for reception on line 716. The failure signal on line 520 is transmitted to other circuitry which controls the operation of reversing motor 22.

The calculation circuitry of FIGS. 7A and 7B generally controls other circuitry, not illustrated, which operate displays, printers, coin changers, or the like. The output signal for controlling such peripheral equipment appears as a series of pulses on line 717. Line 717 transmits one pulse for each cent to be printed, indicated or displayed. The calculation circuitry is able to generate the correct number of pulses by counting master clock pulses (100 KHz) on line 718. The counting is carried out synchronously with the money count in the money select circuitry. As stated previously the money select count is initiated by a signal on line 715 of the calculation circuitry and terminates when counters 607 through 609 have been counted down. The DONE signal, which appears on line 612 to signify end of count, is transmitted to the calculation circuitry for reception by line 719.

The calculation circuitry receives other input signals on lines 720 through 724. The signal on line 720 is a delayed registration signal. Whenever the system senses an individual empty container and generates a registration signal at the output of one of the registration circuits, the registration signal is also applied to delay circuitry, not illustrated. After a suitable delay in the order of about 5 microseconds, the registration signal is applied to line 720.

Line 721 receives a carton recognition signal from line 533 of the carton latch circuit. This carton recognition signal prevents double registration when a carton is present.

Line 722 is connected to receive carton registration pulses from line 530 of the carton latch circuit. As stated previously, these pulses represent carton bottle pairs.

Line 723 receives a master clear LO signal from status circuitry, not illustrated. The signal on line 723 goes LO 250 milliseconds after power is applied to the system.

Line 724 receives delayed carton registration signals from delay circuitry, not illustrated. This signal is required for processing carton having a single row of tandem bottles. The bottle count for single containers is doubled in the bottle select circuitry. The signal on line 724 informs the calculation circuitry that the multiplication need not be performed, even though a carton is present. The multiplication operation is performed through interconnection between flip-flop 712 and counter 713.

Output line 725 carries a bottle count. Line 725 transmits one pulse for each empty beverage container which is recognized by the system. If the containers are carried by a carton, line 725 transmits one pulse for each container in the carton.

Output lines 726 and 727 are connected to the money select circuitry of FIG. 6. Line 726 supplies the clock signal, which is received by the money select circuitry on line 610. Line 727 provides a latch reset signal, which is received by the money select circuitry on line 613. Lines 728 through 731 are optional calculation output lines for use in computing sales tax.

The money count division, which has been referred to above, is carried out by flip-flop 709. This division provides a true return value for individual empty containers.

While the form of apparatus herein described constitutes a preferred embodiment of the invention, it is to be understood that the invention is not limited to this precise form of apparatus, and that changes may be made therein without departing from the scope of the invention.

What is claimed is:

1. In an apparatus for receiving empty containers comprising conveyor means for accepting said containers and carrying them to a storage area, alignment means for aligning said containers in single file along said conveyor means, illumination means for directing illumination across the path of movement of said containers, photosensing means for generating sensing signals indicating the presence of a container within said illumination, and identification means responsive to said photosensing means for identifying containers being sensed thereby; the improvement wherein said identification means comprises clock means for generating clock pulses corresponding to the movement of said conveyor means, counting means for counting said clock pulses, count initiating means responsive to said sensing signals for activating said counting means to count to a predetermined minimum count when a sensing signal indicates a light-to-dark transition, and signal generating means for generating a registration signal when said sensing signal undergoes a dark-to-light transition while said counting means is counting within a predetermined counting range following said minimum count.

2. Apparatus according to claim 1 wherein said identification means comprises a plurality of signal generating means as aforesaid; said signal generators generating different registration signals in response to occurrence of said dark-to-light transition during different predetermined counting ranges.

3. Apparatus according to claim 2 wherein said identification means comprises a plurality of registration circuits, each comprising counting means as aforesaid, count initiating means as aforesaid and signal generating means as aforesaid.

4. Apparatus according to claim 3 wherein each said counting means generates a first count signal and a second count signal; each said signal generating means comprising logic means activated during the time period between corresponding first and second count signals for responding to a dark-to-light transition of a sensing signal and causing generation of a registration signal.

5. Apparatus according to claim 4 wherein each said counting means comprises a first counter for generating said first count signal and a second counter for generating said second count signal, said first counter being connected for counting clock pulses occurring subsequent to a light-to-dark transition of a sensing signal and said second counter being connected for activation by said logic means to count clock pulses occurring subsequent to said first count signal.

6. Apparatus according to claim 5 wherein said logic means comprises a first flip-flop which is set by said first count signal and reset by said second count signal, and a second flip-flop which is triggered by occurrence of a dark-to-light transition of a sensing signal while said first flip-flop is set.

7. Apparatus according to claim 4 wherein said photosensing means comprises a plurality of photocells arranged in a vertically extending column.

8. Apparatus according to claim 7 wherein said identification means further comprises means for inhibiting operation of said registration circuits while illumination is falling upon predetermined ones of said photocells.

9. Apparatus according to claim 4 wherein at least one of said registration circuits comprises second counting means activated by a light-to-dark transition of a sensing signal for generating third and fourth count signals, and said logic means comprises means to cause activation thereof for production of said registration signal only under conditions when a dark-to-light transition of the signal from one predetermined photocell occurs during the time period between said first and second count signals and a dark-to-light transition of the signal from a different predetermined one of said photocells occurs during the time period between said third and fourth count signals.

10. Apparatus according to claim 1 wherein said counting means comprises a first counter connected for counting clock pulses occurring subsequent to a light-to-dark transition of a sensing signal and generating a first counting signal when said predetermined minimum count has been reached, and a second counter activated by said counting signal for counting through said predetermined counting range and generating a second counting signal; said signal generating means comprising logic means activated during the time between said first and second counting signals for responding to a dark-to-light transition of a sensing signal and causing generation of said registration signal.

11. Apparatus according to claim 10 wherein said logic means comprises a first flip-flop which is set by said first counting signal and reset by said second counting signal, and a second flip-flop which is triggered by occurrence of a dark-to-light transition of a sensing signal while said first flip-flop is set.

12. Apparatus according to claim 11 wherein said photosensing means comprises a plurality of photocells arranged in a vertically extending column.

13. Apparatus according to claim 12 wherein said identification means further comprises means for inhibiting operation of said registration circuits while illumination is falling upon predetermined ones of said photocells.

14. Apparatus according to claim 12 wherein said illumination means generates a separate parallel beam of light for each of said photocells.

15. Apparatus according to any of claims 10 through 14 wherein said identification means includes a registration circuit comprising second counting means activated by a light-to-dark transition of a sensing signal for generating third and fourth count signals, and said logic means comprises means to cause activation thereof for production of said registration signal only under conditions when a dark-to-light transition of the signal from one predetermined photocell occurs during the time period between said first and second count signals and a dark-to-light transition of the signal from a different predetermined one of said photocells occurs during the time period between said third and fourth count signals.

16. Apparatus according to any of claims 1 through 29 wherein said apparatus comprises means for accepting said containers individually and in open top cartons, means for separating said cartons from said individual containers, and return means responsive to said identification means for returning improperly filled cartons to a return point.

17. Apparatus according to claim 16 wherein said alignment means comprises a sideboard extending upwardly along one side of said conveyor and means for urging said containers sidewardly against said sideboard.

18. Method of recognizing a container comprising the steps of:
transporting said container through an observation station,
generating a series of clock pulses in synchronism with movement of said container through said observation station,
observing said container during movement through said observation station and generating a first transition signal when the leading edge of said container passes a predetermined leading edge observation point,
counting said clock pulses which occur after generation of said first transition signal and generating first and second count signals in response to occurrence of predetermined first and second values for said count,
continuing to observe the movement of said container through said observation station and generating a second transition signal when the trailing edge of said container passes a predetermined trailing edge observation point, and generating a recognition signal if said second transition signal occurs after said first count signal and prior to said second count signal.

19. Method according to claim 18 further comprising the steps of:
generating another first transition signal when the leading edge of said container passes another predetermined leading edge observation point,
counting said clock pulses which occur after generation of said another first transition signal and generating third and fourth count signals in response to occurrence of predetermined third and fourth values for said count,
generating another second transition signal when the trailing edge of said container passes another predetermined trailing edge observation point, and
generating said recognition signal only upon joint occurrence of said second transition signal between said first and second count signals and said another second transition signal between said third and fourth count signals.

* * * * *

UNITED STATES PATENT AND TRADEMARK OFFICE
CERTIFICATE OF CORRECTION

PATENT NO. : 4,276,467

DATED : June 30, 1981

INVENTOR(S) : Gregory T. Dubberly and Robert J. McGowan

It is certified that error appears in the above—identified patent and that said Letters Patent is hereby corrected as shown below:

Column 10, line 35, "29" should be --14--.

Signed and Sealed this

Twenty-ninth Day of September 1981

[SEAL]

Attest:

GERALD J. MOSSINGHOFF

Attesting Officer

Commissioner of Patents and Trademarks